United States Patent Office 2,857,545
Patented Oct. 21, 1958

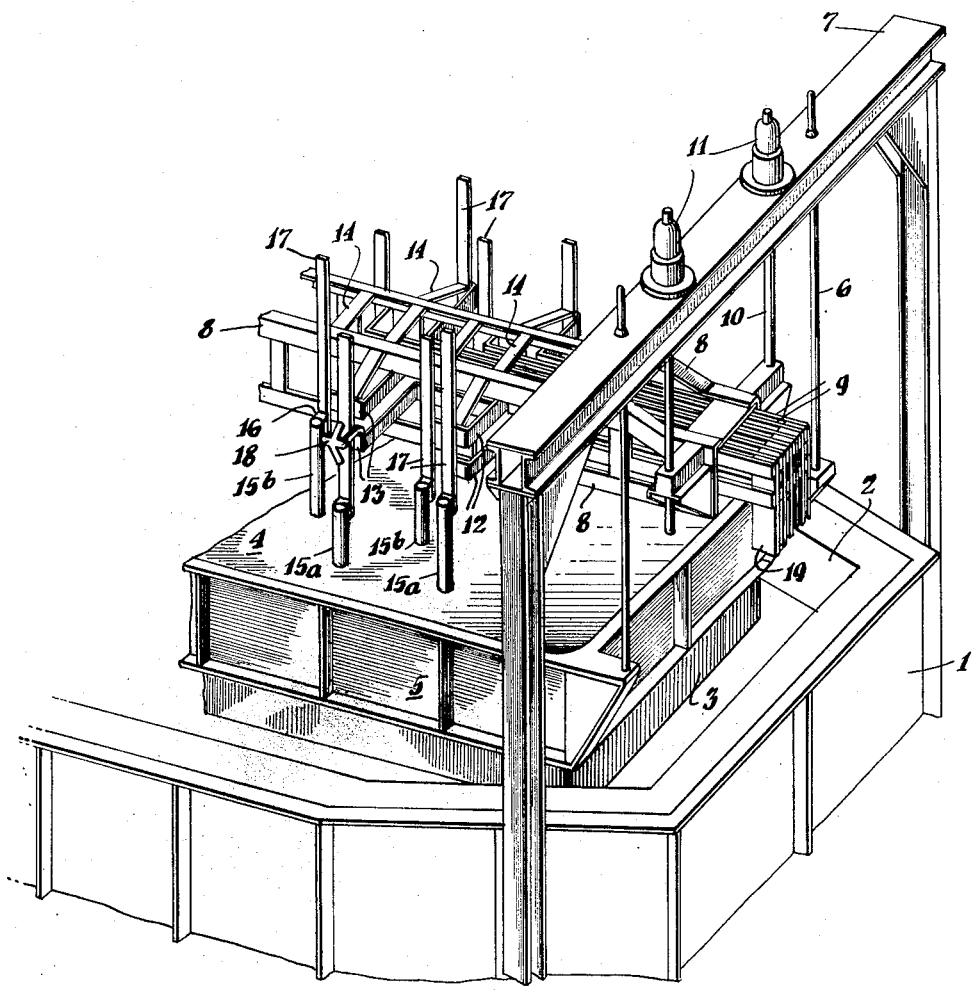

2,857,545

ARRANGEMENT OF THE VERTICAL CONTACT RODS OF SELFBAKING ANODES IN FURNACE FOR ELECTROLYTIC RECOVERY OF ALUMINIUM

Heinrich Wunderli, Lausanne, Switzerland, assignor to Elektrokemisk A/S, Oslo, Norway, a corporation of Norway Application August 4, 1953, Serial No. 372,241

Claims priority, application Switzerland August 13, 1952

4 Claims. (Cl. 313—327)

In the production of aluminium by electrolysis from alumina dissolved in molten fluorides, prebaked or selfbaking anodes are used. For some years electrolytic furnaces for aluminium with selfbaking anodes have been in operation, in which the iron casing into which the crude carbonaceous mass is filled, molded and baked, is permanent, that is, it is neither melted away as the anode is consumed, nor removed otherwise. The current is supplied through vertical contact rods as for example described in U. S. patent specification No. 2,224,739. The anode slides gradually downwards through the permanent casing which remains stationary.

The electrolytic aluminium furnaces are now built bigger than before, and most of them have a capacity in the range of 30,000 to 60,000 amperes. There are even furnaces in operation with a capacity of 100,000 amperes.

In smaller electrolytic aluminium furnaces with selfbaking anodes the vertical contact rods are connected to two parallel bus bars above the furnace. Furnaces with higher amperage need at least four rows of contact rods. The rods are then alternately connected to the two sides of one of these bus bars.

Most of the furnaces with selfbaking anodes and vertical contact rods now in operation have such arrangement. (U. S. patent specification 2,526,876.) This method of connecting the vertical contact rods on both sides of two parallel bus bar supports on an electrolytic aluminium furnace with selfbaking anode has, however, various, very important drawbacks:

(1) The two inner rows of contact rods are only with difficulty accessible from the outside. Changing or raising of the rods is complicated. It is often necessary for the worker to climb up on the anode where he is subjected to strong heat and fumes during the raising operation.

(2) The means serving to connect the rods to the inner bus bars are either impossible to operate from the outside or such operation is very complicated.

(3) The contact surfaces on the bus bars must be cleaned from time to time and those of the inner rows of rods are difficult of access.

(4) When the rods are to be raised, they must be pulled out of the anode to permit filling of the resulting cavity with anode mass. They are then mostly replaced by cold rods which results in less development of fumes. As regards the inner row of rods these must be raised so high that they can pass above the bus bar supports. This requires a correspondingly greater height of the crane and possibly also of the building.

(5) The bus bars consist generally of an aluminium profile of even cross sections throughout the whole bar. When supplying current from both ends of the bar, the amperage will be reduced towards the middle of the furnace which means that this part of the bar will be over-dimensioned and more aluminium is used than actually necessary. When supplying current only from one end the over-dimensioning will be still more marked.

According to the present invention the above mentioned drawbacks may be eliminated. The invention relates to an arrangement of the vertical contact rods according to which these are connected with the horizontal bus bars above the furnace from the outside, that is from the furnace wall, whereby at least two rows of rods are formed on each side of one bus bar, and their distances from the middle line of the bus bar are different.

When in view of the furnace size it is suitable the rods of the inner rows are directly connected to the horizontal bus bars, while the rods of both outer rows are connected to outwardly projecting parts of the bus bars.

It is, however, also possible to connect all rods to the ends of lateral projections of the bus bars, having different lengths. The length and number of the projections may be chosen as desired, permitting any arrangement of the rods. The expression "different lengths" of the projections does of course not mean that each projection must differ in length from all others.

When the rods are only connected with the ends of the projections, it is suitable to have one half of the projections very small whereby the rods connected therewith will be situated close to the horizontal bus bars and form the two inner rows of rods, while the other half of the projections are so long that the rods connected therewith will form the outer rows.

The invention of course may be used with more than two rows of rods on each side of the horizontal bus bars.

In all applications of the present invention, the means of connection are easily accessible from the outside.

It is most suitable to make the outward projections by bending out at right angles the ends of current carrying bars so that each rod will at least have one bar. This arrangement has the advantage that the cross section of each bar may have correct dimensions along all its length.

To compensate possible differences in voltage, it may be, by current supply from both ends, advisable to let one or more bars extend all along the anode. This is also advantageous for the reason that the contact rods which have a low position in the anode take more current than the higher positioned ones. It may, however, happen that the bar ends bent at right angles are overloaded. Such periodical overloading may be eliminated by attaching another conductor to said bent ends, thus increasing their cross section. This conductor should preferably be of the same material as the bar. The resulting over-dimensioning is not so serious as that mentioned above.

It is of course possible to make the horizontal bus bar arrangement totally or nearly totally from current conducting bars to take the whole weight of the electrode. This would, however, mean over-dimensioning their cross section to obtain a sufficient mechanical strength. It is therefore advisable to reinforce the horizontal bus bars with iron.

An arrangement where the horizontal bus bar mainly consists of conductors carried in a frame of iron is very advantageous. This iron frame is then provided with lateral projections corresponding to those of the bus bars. The iron frame will then taken over the main weight of the rods and consequently of the anode.

The conductors carried by the iron frame are preferably only connected rigidly to the iron at their bent end parts, thus permitting a free longitudinal expansion or contraction under the influence of temperature variations.

This structure is illustrated in the accompanying drawing which shows a perspective view of a portion of an aluminium pot embodying my invention.

1 is the furnace pot with lining 2, 3 is the lower baked part of the continuous anode, 4 surface of the anode consisting of crude, unbaked carbonaceous mass. For the sake of simplicity, the electrolyte with its cover of alumina is not shown. This would fill out the space between the lower part 3 of the anode and the furnace lining 2. The iron hood for collecting the furnace gas is not shown either. 5 is the permanent casing in which the anode is moulded and baked. In the present case it is suspended from the frame 7 by means of the rods 6.

The horizontal current supply arrangement for the anode above the furnace is formed by the iron frame 8 and the aluminium bus bars 9. It is suspended in four spindles 10, which can be actuated by the mechanism 11. The conductors 9 have ends 12 bent at right angles, and at 13 again bent at right angles to provide a wide contact surface. The iron frame 8 carrying the conductor is provided with lateral projections 14 whose ends are connected with the bent ends 13 of the bus bars, and said projections will therefore carry the principal weight of the vertical rods and the anode. 15a and 15b are the iron contact rods. By means of the members 16 they are connected with the aluminium flat rods 17 by welding or screws, thus establishing connection with the ends 13 of the bars by means of the clips 18 of which only one is shown. In the present example the vertical contact rods 15a and 15b are alternately connected with the projections 12 by means of the aluminium flat rods 17 and attached to the body of the horizontal current supply arrangement. The furnace will thus have two outer rows of contact rods (15a) and two inner rows of contact rods (15b).

All connection ends of the rods at the horizontal current supply arrangement are easily accessible from the furnace wall. All contact rods are connected with the current supplying bars above the furnace from the outside. The bus bars are collected in two bundles, one above the other. At their ends projecting from the frame 8 they are connected with the conductors 19 (the connecting device is not shown). Only the ends of the conductors 19 are shown on the drawing. The bus bars 9 are not touching each other and the size of the space between them is mainly determined by the thickness of the conductors 19. This arrangement has especially the advantage that the air will cool the bus bars better. It is advantageous to place small distance plates of aluminium between the bars evenly distributed along them, this is especially to compensate for an uneven load on the bus bars. In the present example no compensating bars are shown. If such bars are to be used, one bar is placed in the upper bundle of conductors and one in the lower, said bars leading from one end of the horizontal current supplying arrangement to the other.

The furnace outfit of which only one half is illustrated is arranged for current supply from both ends.

The arrangement of the vertical contact rods according to the invention presents considerable advantages in comparison with the prior art arrangements mentioned in the introduction of this specification. The better accessibility has already been pointed out. The means of attachment of which one type (18) is indicated in the drawing can be the same for the contact rods of both inner and outer rows, this also applies to the contact surfaces. Since all of the longitudinal components of the bus bar construction are between the two innermost rows of vertical rods, when raising or exchanging the rods the same procedure may be used for the rods of the inner and the outer rows. When removing contact rods, it is only necessary to lift them so much that their lower end will just be above the anode casing. The cross section of the current supplying conductor will in practice not have to be over-dimensioned.

It is of course obvious that within the scope of the invention also other ways of application are possible than that illustrated in the drawing.

I claim:

1. In an electrode construction of the type described comprising a rectangular electrode of the continuous self-baking type extending down into a metallic bath and vertical iron rods extending up out of the electrode whereby the electrode is suspended and current is transmitted to the electrode, a single, centrally located construction running longitudinally over the top of the electrode adapted to serve both as a bus bar and as a unitary weight carrying member to support the electrode, pluralities of rows of said vertical rods on each side of such bus bar construction arranged so that all the longitudinal parts of the bus bar construction are between the two innermost rows of such vertical rods and projections extending laterally from the bus bar to which such vertical rods are attached whereby access can be had to the inner rows of vertical rods from the sides of the electrode without interference from longitudinal bus bar members.

2. A structure as specified in claim 1 in which the bus bar construction comprises a composite bus bar formed of strips of conductive material, which strips are electrically connected and are progressively bent out sideways to form projections for attachment to the vertical rods so that as the distance from the point of input current to the bus bar members increases, the aggregate cross-sectional area of the bus bar members will decrease.

3. A structure as specified in claim 1 in which the bus bar construction comprises an iron frame adapted to reinforce the conductive members of the bus bar.

4. A structure as specified in claim 3 in which the iron frame is provided with projections to which the vertical rods can be attached whereby such vertical rods and the electrode are supported.

References Cited in the file of this patent

UNITED STATES PATENTS

| 2,224,739 | Manfredini | Dec. 10, 1940 |
| 2,475,452 | Jouannet | July 5, 1949 |

FOREIGN PATENTS

| 601,873 | Great Britain | May 13, 1948 |
| 611,455 | Great Britain | Oct. 29, 1948 |